Patented Dec. 11, 1951

2,578,522

UNITED STATES PATENT OFFICE 2,578,522

PROCESS OF PREPARING UNSUPPORTED FILMS OF POLYTETRAFLUOROETHYLENE

Donald Edwards Edgar, Westport, Conn., assignor to E. I. du Pont de Nemours and Company, Wilmington, Del., a corporation of Delaware No Drawing. Application June 8, 1949, Serial No. 97,929

6 Claims. (Cl. 18—47.5)

This invention relates to a process of preparing unsupported films of polytetrafluoroethylene.

Polytetrafluoroethylene is a relatively new polymeric material which has several outstanding properties, such as insolubility in all known solvents, resistance to elevated temperatures which will adversely affect all known film-forming substances, dielectric strength, high insulation resistance, and extremely low dielectric losses. The insolubility of polytetrafluoroethylene, however, seriously limits the mode of producing continuous films of the material.

One method of producing unsupported films of polytetrafluoroethylene is described in U. S. Patent No. 2,406,127, issued August 20, 1946, to J. Alfthan, according to which finely divided polytetrafluoroethylene powder is pressed into a preform and then baked at a temperature between 621° F. and 932° F. until it is sintered throughout. The preform is then cooled and the film is shaved therefrom, heated at a temperature between 621° F. and 932° F., and then quenched.

Another method of producing such unsupported films is described in copending application Serial No. 2,319, filed January 14, 1948, by P. F. Sanders, now Patent 2,520,173 in which a suspension of polytetrafluoroethylene is spread on a soluble metal sheet, the suspending medium is evaporated, the coated metal sheet is heated at a temperature between 621° F. and 932° F., and the coated metal sheet is immersed in a bath which dissolves the metal but does not affect the film.

Still another method is that disclosed in U. S. Patent No. 2,400,099, issued May 14, 1946, to M. M. Brubaker and W. E. Hanford, in which powdered polytetrafluoroethylene is fed between calender rolls and then sintered into a film.

It has now been found that continuous unsupported films of polytetrafluoroethylene can also be prepared by a simple and economical improved process.

An object of this invention, therefore, is to provide a continuous unsupported film of polytetrafluoroethylene. Another object is to provide an improved process for preparing unsupported films of polytetrafluoroethylene. A further object is to provide such a process for preparing unsupported films of polytetrafluoroethylene containing inert fillers and pigments. A still further object is to provide such a process which does not require special apparatus or equipment. These and other important objects will be readily apparent from the description of the invention given below.

The objects of this invention are accomplished by forming finely divided particles of polytetrafluoroethylene into dry, soft, curd-like masses, passing these curd-like masses between pressure rolls (which may or may not be moderately heated, i. e., about 70°–350° F.) to form a continuous flexible film of low mechanical strength, heating the film at a temperature between 621° F. and 932° F. to sinter it to high mechanical strength, and then cooling the film.

The following examples illustrate a preferred embodiment of the invention, the parts being by weight unless otherwise specified:

Example 1

An unsupported film of polytetrafluoroethylene was prepared from an aqueous suspensoid of the following composition:

| | Per cent |
|---|---|
| Finely divided polytetrafluoroethylene | 61.00 |
| Sodium salt of the sulphuric acid ester of a mixture of long chain alcohols (predominantly lauryl alcohol) | .61 |
| Water | 38.39 |
| | 100.00 |

Acetone was added to the suspensoid with rapid mixing until all of the polytetrafluoroethylene particles had coagulated and formed soft curds. The liquid was filtered from the coagulated polytetrafluoroethylene and, after thorough drying, the resulting soft curd-like masses were fed into the bight of an unheated two-roller rubber mill. Under this pressure, the particles adhered to each other and emerged from the rolls as a continuous film about 5 mils thick sufficiently strong to support itself.

The film was then fused to a condition of high mechanical strength by interposing it between an aluminum metal carrier and a drum surface which dipped the film for about one minute into a molten lead bath heated to about 750° F. This was sufficient time to heat it to at least 621° F. (the solid transition temperature of polytetrafluoroethylene).

The fused film was suitable for slitting in narrow strips for insulating electrical wire conductors where high temperature resistance is required.

Example 2

An unsupported film of polytetrafluoroethylene was prepared from 164 parts of the aqueous suspensoid of Example 1. An equal volume of water was added with agitation and, while agitation was continued, 100 parts of ground quartz (325 mesh) were added. After 5 minutes agitation, 198 parts of acetone were added.

The material appeared to form a very stiff emulsion which broke down as progressive coagulation took place under the continued agitation. The material was filtered through a fine sheeting and dried overnight. The resulting dry, soft, curd-like masses were sheeted out in a 5 mils thick film on a laboratory two-roll rubber mill at room temperature. The film was then interwound with aluminum foil and fused by immersing for about one minute in a molten lead bath at 750–775° F. The electrical resistance of the fused film was approximately 500 volts per mil.

Portions of this film, both before and after fusing, were calendered on pressure rolls heated at 30–325° F. This increased the density and improved the surface smoothness of the film, which was then tested for dielectric strength. The results were as follows:

|  | Thickness (mils) | Dielectric Strength (volts per mil) | | |
|---|---|---|---|---|
|  |  | Max. | Min. | Avg. |
| Unfused Film, not calendered | 6.6 | 707 | 305 | 547 |
| Unfused Film, calendered | 5.2 | 1,050 | 315 | 653 |
| Fused Film, not calendered | 5.0 | 360 | 240 | 325 |
| Fused Film, calendered after fusing | 4.1 | 855 | 490 | 646 |

From the above data it will be observed that calendering the film, either before or after fusing, improves the dielectric strength.

*Example 3*

An unsupported film of polytetrafluoroethylene was prepared from 164 parts of an aqueous suspensoid of the following composition:

| | Per cent |
|---|---|
| Finely divided polytetrafluoroethylene | 61.20 |
| Sodium salt of the sulphuric acid ester of a mixture of long chain alcohols (predominantly lauryl alcohol) | .61 |
| Water | 38.19 |
| | 100.00 |

An equal volume of water was added to the suspensoid with rapid agitation, 25 parts of ground quartz (325 mesh) were then slowly added, and the whole mass was agitated 5 minutes more, after which 198 parts of acetone were added, forming a thick emulsion. With continued agitation, the polymer and quartz coagulated. The resulting mixture was filtered through a fine fabric sheeting (7.00–40" combed lawn, count 96×100), and the solid material was spread out in an evaporating dish and dried on a steam table. The material was then broken up into soft curd-like masses and sheeted out into a film by passing it between unheated pressure rolls at room temperature. The resulting film was approximately 3½ mils thick and of low mechanical strength, although self-supporting. This film was wound with an aluminum foil liner and fused by immersing it in a molten lead bath at 750–775° F. for one minute. After fusing, the film had high mechanical strength.

Narrow strips of this unsupported film were spirally wrapped around a $\tfrac{1}{16}$" bronze rod and again immersed in the molten metal bath at 750–775° F. to form a continuous fused sheath. The electrical resistance of a film about 5 mils thick was approximately 550 volts per mil.

*Example 4*

A red colored unsupported film of polytetrafluoroethylene was prepared from the following composition:

| | Parts |
|---|---|
| Polytetrafluoroethylene aqueous suspensoid | 82 |
| Ground quartz (325 mesh) | 40 |
| Titanium dioxide pigment | 5 |
| Iron oxide pigment | 5 |

The polytetrafluoroethylene aqueous suspensoid had the following composition:

| | Per cent |
|---|---|
| Finely divided polytetrafluoroethylene | 61.00 |
| Sodium salt of the sulphuric acid ester of a mixture of long chain alcohols (predominantly lauryl alcohol) | 1.22 |
| Water | 37.78 |
| | 100.00 |

The polytetrafluoroethylene suspensoid, ground quartz filler, and pigments were slurried, and about 119 parts of acetone were added, the mixture being agitated until the non-volatile ingredients were coagulated.

The solid phase of the mixture was separated from the liquid phase by filtering and then thoroughly dried into a filter cake in the form of soft crumbly curds. These were fed into the bight of unheated pressure rolls and there emerged therefrom a continuous, self-supporting film approximately 6 mils thick and of low mechanical strength.

The film was fused to a condition of high mechanical strength by the metal bath immersion described in Example 1.

The fused film was tough and had a voltage breakdown value of 500–600 volts per mil.

*Example 5*

A blue colored unsupported film was prepared in the manner described in Example 4, using the following composition:

| | Parts |
|---|---|
| Polytetrafluoroethylene aqueous suspensoid | 82 |
| Ground quartz (325 mesh) | 40 |
| Titanium dioxide pigment | 8 |
| Copper phthalocyanine blue pigment | 2 |

The solids in the above composition were coagulated by adding 198 parts of acetone.

The polytetrafluoroethylene suspensoid referred to in the foregoing examples may be of the type prepared in accordance with the teaching in copending application Serial No. 713,385, filed November 30, 1946, by Malcolm M. Renfrew, now Patent 2,534,058. Aqueous suspensoids having higher or lower concentrations of polytetrafluoroethylene than those disclosed in the examples may also be used.

In Examples 4 and 5, the colored pigments were so occluded by the polymer and other colorless materials that no color was apparent in the filtrate. The color of the film was not destroyed upon fusing it at 700–750° F.

In the above examples, the coagulant is acetone, but other water soluble organic liquids, such as alcohols, esters, and other ketones, are satisfactory and the invention is not to be limited with respect to the coagulants. For example, coagulation can also be secured by adding certain electrolytes to the aqueous suspensoid.

Although the coagulating and rolling operations disclosed above are carried out at room temperature, moderately elevated temperatures may be used, but they produce no particular advantage.

In place of ground quartz, other inert finely divided fillers, such as asbestos, calcium carbonate, and mica, may be used in practicing this invention. No limitation is to be placed on the particular colored pigments or fillers that can be used, except that they should be inert and should not decompose at the temperatures required for fusion of the polymer.

The pigment and filler content of the compositions described in the examples varies from 0% to 100% by weight, based on the dried polymer. For certain uses, where mechanical strength of the film is not important, higher proportions of pigments and fillers may be employed.

The success of the present invention depends to some extent upon the physical form of the finely divided dry particles of polytetrafluoroethylene. The particles should be small (i. e., comparable to that which will pass a No. 8 U. S. Standard Sieve) and of relatively soft texture. Hard horny particles, although small, are not adapted to this invention.

The wetting agent in the film from the coagulate! polymer is dissipated from the film during fusing and its only usefulness is as a processing adjunct.

In addition to the molten lead bath used for fusing the polytetrafluoroethylene in the above examples other molten metal baths, or other means of applying very high temperatures to the polytetrafluoroethylene film, may be used.

It is within the scope of this invention to use the unfused or partially fused film as a wrapping for either heat or electrical insulation and then fuse the film in situ. For example, wrapping an electrical wire conductor with a 50% overlap on each turn of the fused or unfused film, and then heating between 621° F. and 932° F., will provide a uniform continuous covering for the electrical conductor since the polytetrafluoroethylene film will fuse to an integral sheath.

This invention has been described with respect to finely divided polytetrafluoroethylene, but it is also applicable to interpolymers or copolymers of tetrafluoroethylene with one or more polymerizable organic compounds containing an ethylenic double bond, such as ethylene, vinyl chloride, vinylidene chloride, and alkyl esters of acrylic and methacrylic acids.

In copolymers, the major portion, and preferably at least 85%, should be tetrafluoroethylene.

The invention has been described with respect to electrical insulating tape, but the products of this invention are also useful for tank linings or for general protection against corrosive liquids or gases, as well as for heat insulation in combination with other materials, such as asbestos.

It is apparent that many widely different embodiments of this invention can be made without departing from the spirit and scope thereof; and, therefore, it is not intended to be limited except as indicated in the appended claims.

I claim:

1. A method of preparing unsupported films which comprises adding a coagulant to an aqueous suspensoid of polytetrafluorethylene, rapidly mixing the aqueous suspensoid and the coagulant to form soft curds, separating these curds from the water and coagulant, and passing these curd-like masses between and in contact with pressure rolls at a temperature below the fusion point of polytetrafluoroethylene.

2. The method of claim 1 in which the pressure rolls are maintained at room temperature.

3. The method of claim 2, in which as the next step, the unsupported film is calendered by passing it between pressure rolls heated 300–325° F.

4. A method of preparing unsupported films which comprises adding a coagulant to an aqueous suspensoid of polytetrafluoroethylene, rapidly mixing the aqueous suspensoid and the coagulant to form soft curds, separating these curds from the water and coagulant, passing these curd-like masses between and in contact with pressure rolls at a temperature of not greater than about 350° F., whereby a continuous self-supporting film is produced, heating said film at a temperature between 621° F. and 932° F., and cooling.

5. A method of preparing unsupported films which comprises slurrying pigment and filler into an aqueous suspensoid of polytetrafluoroethylene, adding an organic liquid rapidly mixing the aqueous suspensoid, the organic liquid, the pigment and the filler to form soft curds, separating these curds from the water and organic liquid, and rolling the resulting dry, soft, curdlike particles between and in contact with pressure rolls whose temperature is not greater than about 350° F., whereby a self-supporting film is formed.

6. The method of claim 5, in which the film is subsequently fused by heating it at from 621° F. to 932° F. and then cooling the film.

DONALD EDWARDS EDGAR.

REFERENCES CITED

The following references are of record in the file of this patent:

UNITED STATES PATENTS

| Number | Name | Date |
|---|---|---|
| 2,076,781 | Jacobsen | Apr. 13, 1937 |
| 2,400,099 | Brubaker, et al | May 14, 1946 |
| 2,440,190 | Alfthan | Apr. 20, 1948 |

Certificate of Correction

Patent No. 2,578,522 December 11, 1951

DONALD EDWARDS EDGAR

It is hereby certified that error appears in the printed specification of the above numbered patent requiring correction as follows:

Column 3, line 16, for "30–325° F." read *300–325° F.*; column 5, lines 26 and 27, for "coagulatel" read *coagulated*; column 6, line 18, after "which" insert a comma; line 37, after "liquid" insert a comma; line 41, for "curdlike" read *curd-like*;

and that the said Letters Patent should be read as corrected above, so that the same may conform to the record of the case in the Patent Office.

Signed and sealed this 18th day of March, A. D. 1952.

[SEAL]

THOMAS F. MURPHY,
*Assistant Commissioner of Patents.*

Certificate of Correction

Patent No. 2,578,522                                        December 11, 1951

DONALD EDWARDS EDGAR

It is hereby certified that error appears in the printed specification of the above numbered patent requiring correction as follows:

Column 3, line 16, for "30–325° F." read *300–325° F.*; column 5, lines 26 and 27, for "coagulatel" read *coagulated*; column 6, line 18, after "which" insert a comma; line 37, after "liquid" insert a comma; line 41, for "curdlike" read *curd-like*;

and that the said Letters Patent should be read as corrected above, so that the same may conform to the record of the case in the Patent Office.

Signed and sealed this 18th day of March, A. D. 1952.

[SEAL]

THOMAS F. MURPHY,
*Assistant Commissioner of Patents.*